(12) United States Patent
Holley

(10) Patent No.: US 11,632,409 B2
(45) Date of Patent: Apr. 18, 2023

(54) VIDEO STREAMING SYSTEM USER INTERFACE WITH INDICATIONS OF PAST TIME SLOT CONTENT

(71) Applicant: SLING MEDIA L.L.C., Foster City, CA (US)

(72) Inventor: Erik Holley, Eagle Mountain, UT (US)

(73) Assignee: Sling Media L.L.C., Foster City, CA (US)

( * ) Notice: Subject to any disclaimer, the term of this patent is extended or adjusted under 35 U.S.C. 154(b) by 0 days.

(21) Appl. No.: 16/912,108

(22) Filed: Jun. 25, 2020

(65) Prior Publication Data
US 2021/0409469 A1    Dec. 30, 2021

(51) Int. Cl.
| | |
|---|---|
| *G06F 15/16* | (2006.01) |
| *H04L 65/612* | (2022.01) |
| *H04N 21/45* | (2011.01) |
| *H04N 21/472* | (2011.01) |
| *H04N 21/845* | (2011.01) |
| *H04N 21/6587* | (2011.01) |

(52) U.S. Cl.
CPC ....... *H04L 65/612* (2022.05); *H04N 21/4532* (2013.01); *H04N 21/47202* (2013.01); *H04N 21/6587* (2013.01); *H04N 21/8456* (2013.01)

(58) Field of Classification Search
CPC ............ H04L 65/4084; H04N 21/4532; H04N 21/47202; H04N 21/6587; H04N 21/8456
USPC .......................................... 709/223, 226, 231
See application file for complete search history.

(56) References Cited

U.S. PATENT DOCUMENTS

| | | | | |
|---|---|---|---|---|
| 6,311,011 B1* | 10/2001 | Kuroda | .............. | H04N 21/4334 386/297 |
| 2003/0177495 A1* | 9/2003 | Needham | .................. | H04N 5/76 725/39 |
| 2005/0114886 A1* | 5/2005 | Koresawa | .......... | H04N 21/4821 725/39 |
| 2005/0160458 A1* | 7/2005 | Baumgartner | ......... | H04H 60/46 348/E7.071 |
| 2007/0220553 A1* | 9/2007 | Branam | .................. | H04N 7/173 725/35 |
| 2010/0287588 A1* | 11/2010 | Cox | ...................... | H04N 21/252 725/40 |
| 2011/0271304 A1* | 11/2011 | Loretan | .............. | H04N 21/4438 725/41 |
| 2014/0337888 A1* | 11/2014 | Doan | .................. | H04N 21/4438 725/39 |

* cited by examiner

*Primary Examiner* — Liang Che A Wang
(74) *Attorney, Agent, or Firm* — KW Law, LLP

(57) ABSTRACT

Systems, devices and processes are provided to facilitate the streaming of video content in a video streaming system. Specifically, the various embodiments provide an improved user interface for a video streaming system. In general, this user interface displays indications of program content of past time slots along with current and future time slots in a way that give the user an intuitive understanding of the percentage of remaining time in the current program. Thus, a user can immediately ascertain the percentage of the current program that has already been streamed relative to the percentage of the current program remaining. This information allows a user to more quickly decide if they would like to start viewing a program that has already been streaming for some period of time.

20 Claims, 9 Drawing Sheets

| | 1:30P | 2:00P | 2:30P | 3:00P | 3:30P | 4:00P | 4:30P | |
|---|---|---|---|---|---|---|---|---|
| CN 1 | PREVIOUS PROGRAM CONTENT | CURRENT PROGRAM CONTENT | | | | FUTURE PROGRAM CONTENT | | ~310 |
| CN 2 | PREVIOUS PROGRAM CONTENT | CURRENT PROGRAM CONTENT | | FUTURE PROGRAM CONTENT | | FUTURE PROGRAM CONTENT | | ~310 |
| CN 3 | PREVIOUS PROGRAM CONTENT | | CURRENT PROGRAM CONTENT | FUTURE PROGRAM CONTENT | | | | ~310 |
| CN 4 | PREVIOUS PROGRAM CONTENT | | CURRENT PROGRAM CONTENT | | | | FUTURE PROGRAM CONTENT | ~310 |
| CN 5 | CURRENT PROGRAM CONTENT | | | FUTURE PROGRAM CONTENT | | | | ~310 |

308

| | 1:30P | 2:00P | 2:30P | 3:00P | 3:30P | 4:00P | 4:30P |
|---|---|---|---|---|---|---|---|
| CN 1 | PAST TIME SLOT | PAST TIME SLOT | CURRENT TIME SLOT | FUTURE TIME SLOT | FUTURE TIME SLOT | FUTURE TIME SLOT | FUTURE TIME SLOT |
| CN 2 | PAST TIME SLOT | PAST TIME SLOT | CURRENT TIME SLOT | FUTURE TIME SLOT | FUTURE TIME SLOT | FUTURE TIME SLOT | FUTURE TIME SLOT |
| CN 3 | PAST TIME SLOT | PAST TIME SLOT | CURRENT TIME SLOT | FUTURE TIME SLOT | FUTURE TIME SLOT | FUTURE TIME SLOT | FUTURE TIME SLOT |
| CN 4 | PAST TIME SLOT | PAST TIME SLOT | CURRENT TIME SLOT | FUTURE TIME SLOT | FUTURE TIME SLOT | FUTURE TIME SLOT | FUTURE TIME SLOT |
| CN 5 | PAST TIME SLOT | PAST TIME SLOT | CURRENT TIME SLOT | FUTURE TIME SLOT | FUTURE TIME SLOT | FUTURE TIME SLOT | FUTURE TIME SLOT |

FIG. 2

|  | 1:30P | 2:00P | 2:30P | 3:00P | 3:30P | 4:00P | 4:30P |
|---|---|---|---|---|---|---|---|
| CN 1 | PREVIOUS PROGRAM CONTENT | CURRENT PROGRAM CONTENT | | | | FUTURE PROGRAM CONTENT | FUTURE PROGRAM CONTENT |
| CN 2 | PREVIOUS PROGRAM CONTENT | CURRENT PROGRAM CONTENT | | | FUTURE PROGRAM CONTENT | | |
| CN 3 | PREVIOUS PROGRAM CONTENT | | CURRENT PROGRAM CONTENT | FUTURE PROGRAM CONTENT | | | |
| CN 4 | PREVIOUS PROGRAM CONTENT | | CURRENT PROGRAM CONTENT | | | FUTURE PROGRAM CONTENT | |
| CN 5 | CURRENT PROGRAM CONTENT | | | FUTURE PROGRAM CONTENT | | | |

FIG. 3A

VIDEO STREAMING SYSTEM USER INTERFACE WITH INDICATIONS OF PAST TIME SLOT CONTENT

TECHNICAL FIELD

The following discussion generally relates to video streaming systems. More particularly, the following discussion relates to user interfaces for video streaming systems.

BACKGROUND

Media content, including video-on-demand (VOD) and television (TV) programming, has traditionally been delivered to viewers over legacy cable and satellite broadcast systems. More recently, various streaming video platforms have been introduced by media content providers and gained widespread commercial adoption; the term "media content provider," as appearing herein, encompassing all types of media content sources, aggregators, and the like from which content-containing digital or analog signals can be obtained for viewing on user devices. The term "media content providers" thus encompasses cable, satellite, and over-the-top (OTT) TV providers, as well as entities owning or operating streaming video platforms. It is also now commonplace for end users to placeshift media content stored in memory contained in or accessible to a home media receiver, such as a set top box (STB) located at the end user's residence, over a network for viewing on a smartphone, tablet, or other portable media receiver operated by the end user.

There is a long standing desire to improve the user experience for users of such streaming systems. For example, there is a continuing need to improve the user interface presented to users by the streaming system. For example, there is a continuing need to provide increased information and improved control to the user of the streaming system. Other desirable features and characteristics will become apparent from the subsequent detailed description and the appended claims, taken in conjunction with the accompanying drawings and this background section.

BRIEF SUMMARY

The various embodiments descried herein provide systems, devices and/or processes to improve the delivery of commercial content in a video streaming system. Specifically, the various embodiments provide an improved user interface for a video streaming system. In general, this user interface displays programming information to the user for a plurality of program channels and facilitates user selection of program channels for streaming. The user interface described herein presents this programming information to the user in a more intuitive and useful manner. Specifically, in one embodiment the user interface displays indications of program content of past time slots along with current and future time slots in a way that give the user an intuitive understanding of the percentage of remaining time in the current program. Thus, a user can immediately ascertain the percentage of the current program that has already been streamed relative to the percentage of the current program remaining. This information allows a user to more quickly decide if they would like to start viewing a program that has already been streaming for some period of time. Thus, the improved user interface increases information provided to the user and improves the user experience of the video streaming system.

In one example embodiment, an automated process is executable by a streaming server in communication with a video player device over a network. In such an embodiment the automated process comprises: generating data for a user interface for display at the video player device, where the user interface includes: a plurality of rows, each of the plurality of rows corresponding to a program channel of a plurality of program channels, and wherein each of the plurality of rows includes: an indication of program content for at least one past time slot; an indication of program content for a current time slot; an indication of program content for at least one future time slot; and receiving a user input via the user interface to select a program channel in the plurality of program channels.

A further example may be implemented wherein the user interface further includes a highlighted indication of current program content in each of the plurality of rows. A further example may be implemented wherein the highlighted indication of current program content comprises a display of different color relative to other portions of the row. A further example may be implemented wherein highlighted indication of current program content comprises a display of different intensity relative to other portions of the row. A further example may be implemented wherein the user interface further includes a current time indicator proximate the plurality of rows. A further example may be implemented wherein the current time indicator comprises a line extending over the plurality of rows. A further example may be implemented wherein the user interface facilitates a user input to increase or decrease a number of rows in the plurality of rows. A further example may be implemented wherein the user interface is configured to increase or decrease a number of past time slots indicated in each of the plurality of rows responsive to a user input. A further example may be implemented wherein the user interface is configured to increase or decrease a number of future time slots indicated in each of the plurality of rows responsive to a user input. A further example may be implemented further comprising streaming the selected program channel as a video stream from the streaming server to the video player device.

In another example embodiment, an automated process executable by a streaming server in communication with a video player device over a network is provided, the automated process comprising: generating data for a user interface for display at the video player device, where the user interface includes: a plurality of rows, each of the plurality of rows corresponding to a program channel of a plurality of program channels, and wherein each of the plurality of rows includes: an indication of program content for a plurality of past time slots; an indication of program content for a current time slot; an indication of program content for a plurality of future time slots; and wherein current program content is highlighted in the row; and a current time indicator proximate the plurality of rows; receiving a user input via the user interface to select a program channel in the plurality of program channels; and streaming the selected program channel as a video stream from the streaming server to the video player device.

In another example embodiment, a streaming server in communication with a video player device over a network is provided, the streaming server comprising a processor and a memory, wherein the processor is configured to perform an automated process by executing digital instructions stored in the memory, wherein the automated process comprises: generating data for a user interface for display at the video player device, where the user interface includes: a plurality of rows, each of the plurality of rows corresponding to a program channel of a plurality of program channels, and wherein each of the plurality of rows includes: an indication of program content for at least one past time slot; an indication of program content for a current time slot; an indication of program content for at least one future time slot; and receiving a user input via the user interface to select a program channel in the plurality of program channels.

A further example of the streaming server may be implemented wherein the user interface further includes a highlighted indication of current program content in each of the plurality of rows. A further example of the streaming server may be implemented wherein the highlighted indication of current program content comprises a display of different color relative to other portions of the row. A further example of the streaming server may be implemented wherein highlighted indication of current program content comprises a display of different intensity relative to other portions of the row. A further example of the streaming server may be implemented wherein the user interface further includes a current time indicator proximate the plurality of rows. A further example of the streaming server may be implemented wherein the current time indicator comprises a line extending over the plurality of rows. A further example of the streaming server may be implemented wherein the user interface facilitates a user input to increase or decrease a number of rows in the plurality of rows. A further example of the streaming server may be implemented wherein the user interface is configured to increase or decrease a number of past time slots indicated in each of the plurality of rows responsive to a user input. A further example of the streaming server may be implemented wherein the user interface is configured to increase or decrease a number of future time slots indicated in each of the plurality of rows responsive to a user input. A further example of the streaming server may be implemented where the automated process further comprises streaming the selected program channel as a video stream from the streaming server to the video player device.

Various additional examples, aspects and other features are described in more detail below.

BRIEF DESCRIPTION OF THE DRAWING FIGURES

Exemplary embodiments will hereinafter be described in conjunction with the following drawing figures, wherein like numerals denote like elements, and:

FIG. 2 is a schematic view of a user interface in accordance with an embodiment;

FIGS. 3A and 3B are schematic views of a user interface in accordance with another embodiment;

Figure 4A:
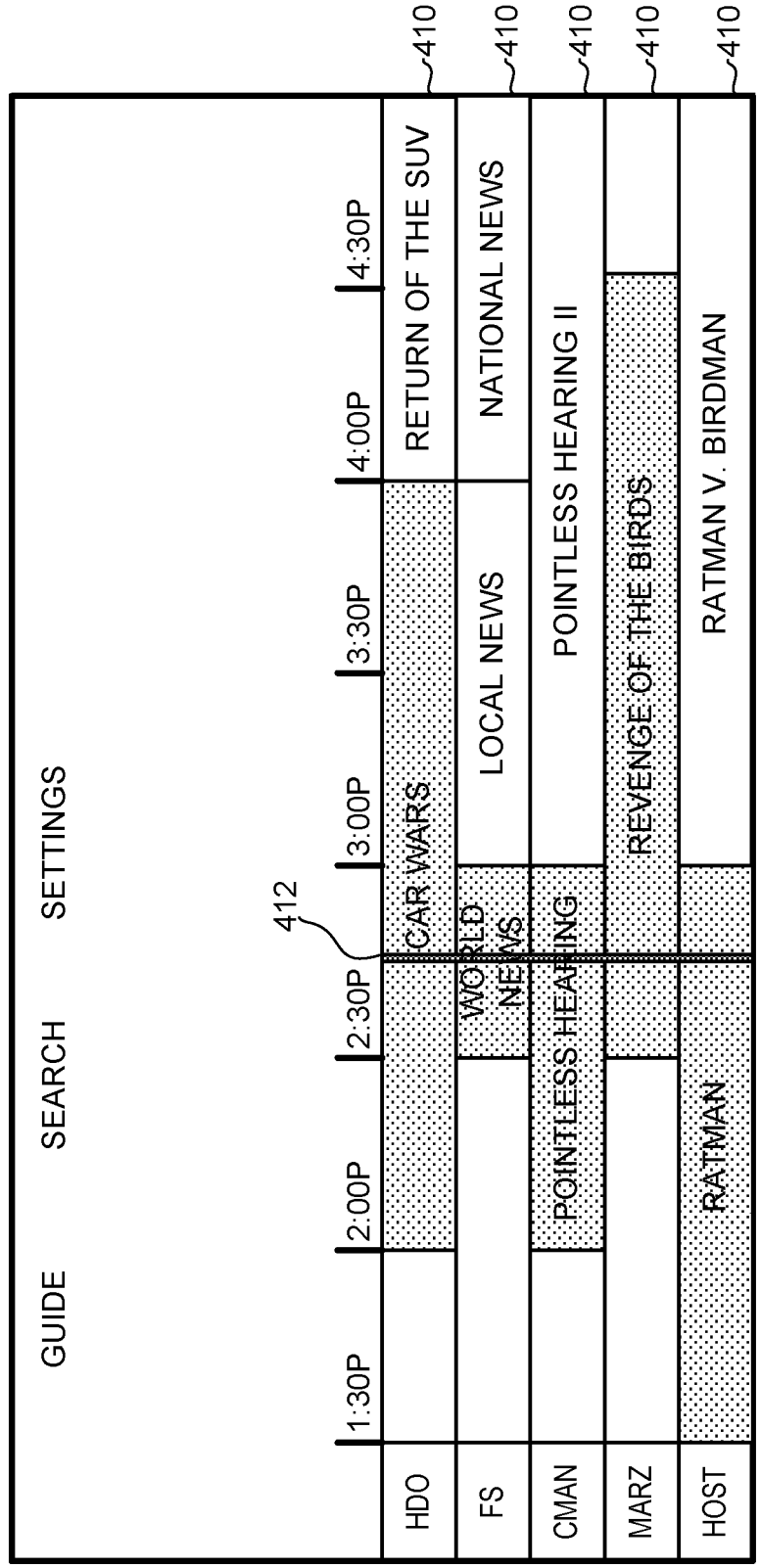
Figure 4B:
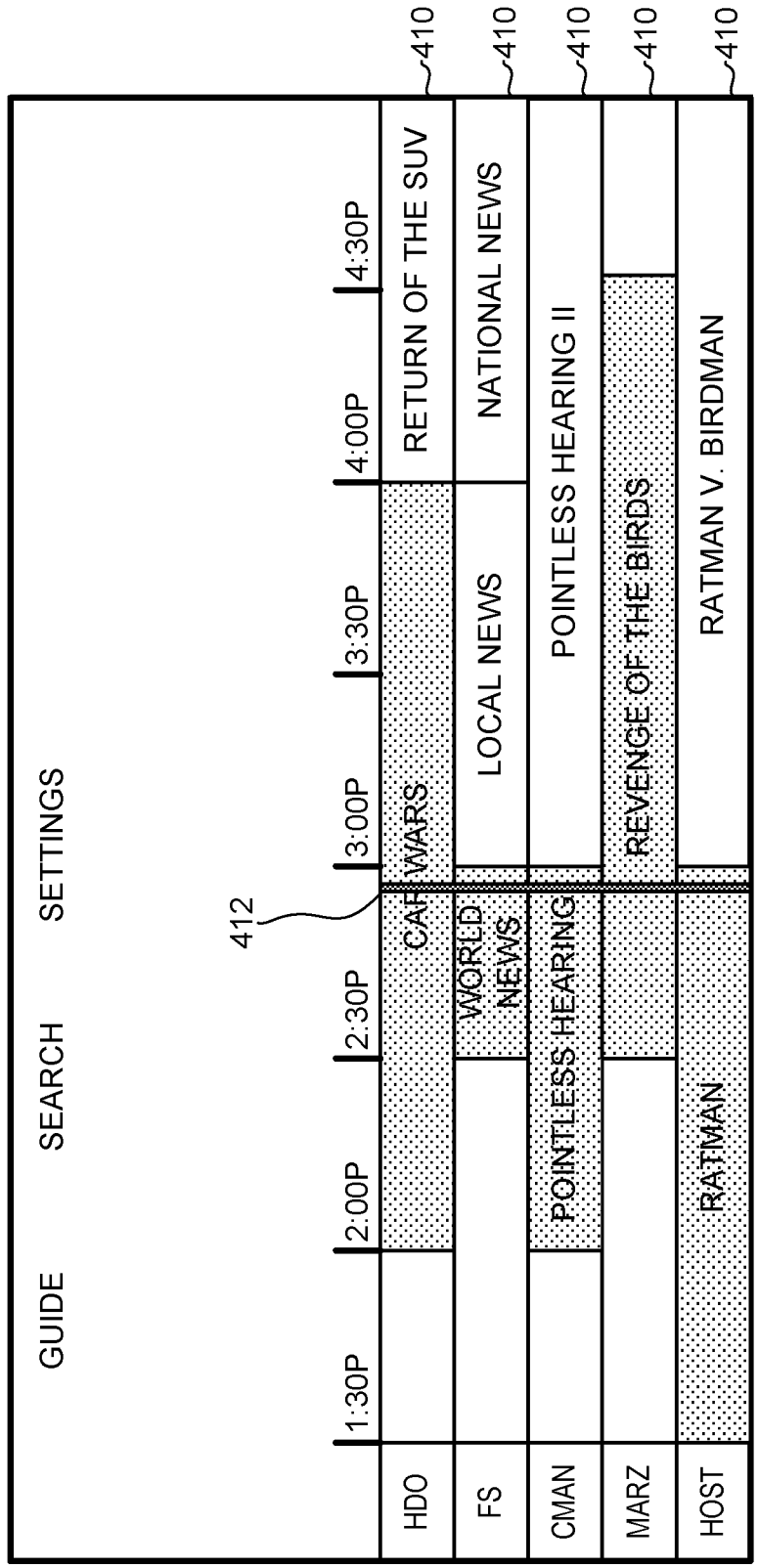
Figure 4C:
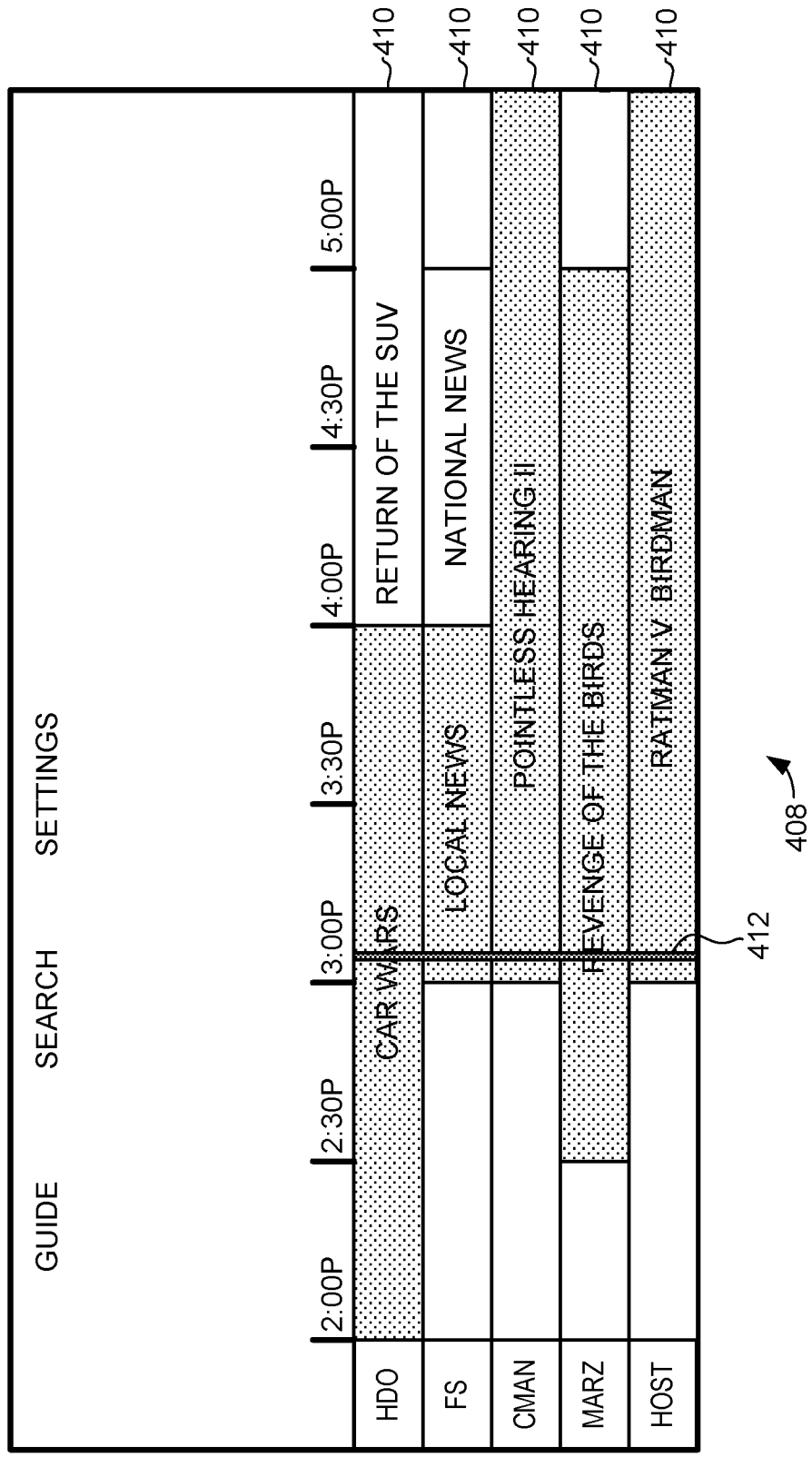
Figure 5:
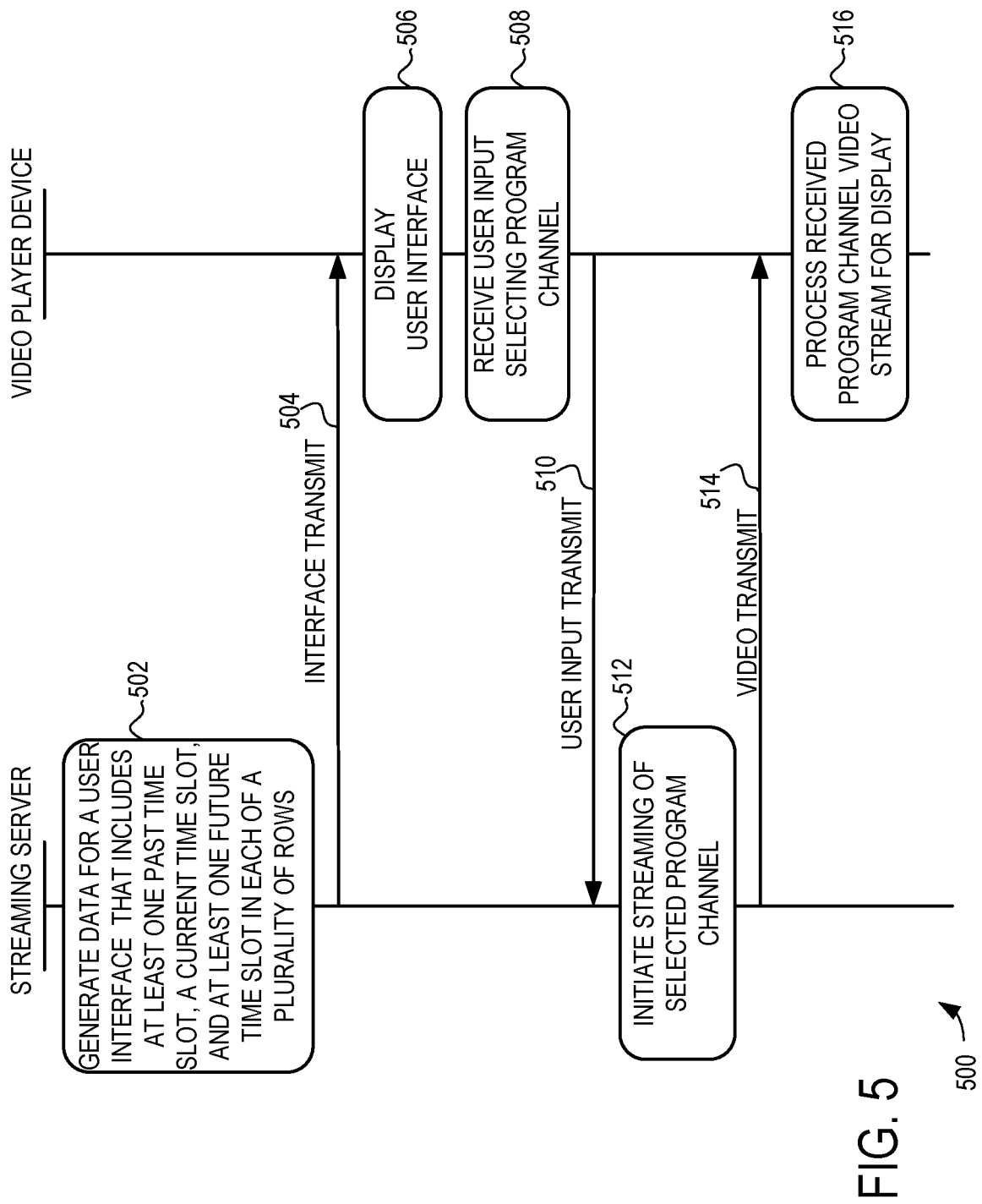
Figure 6:
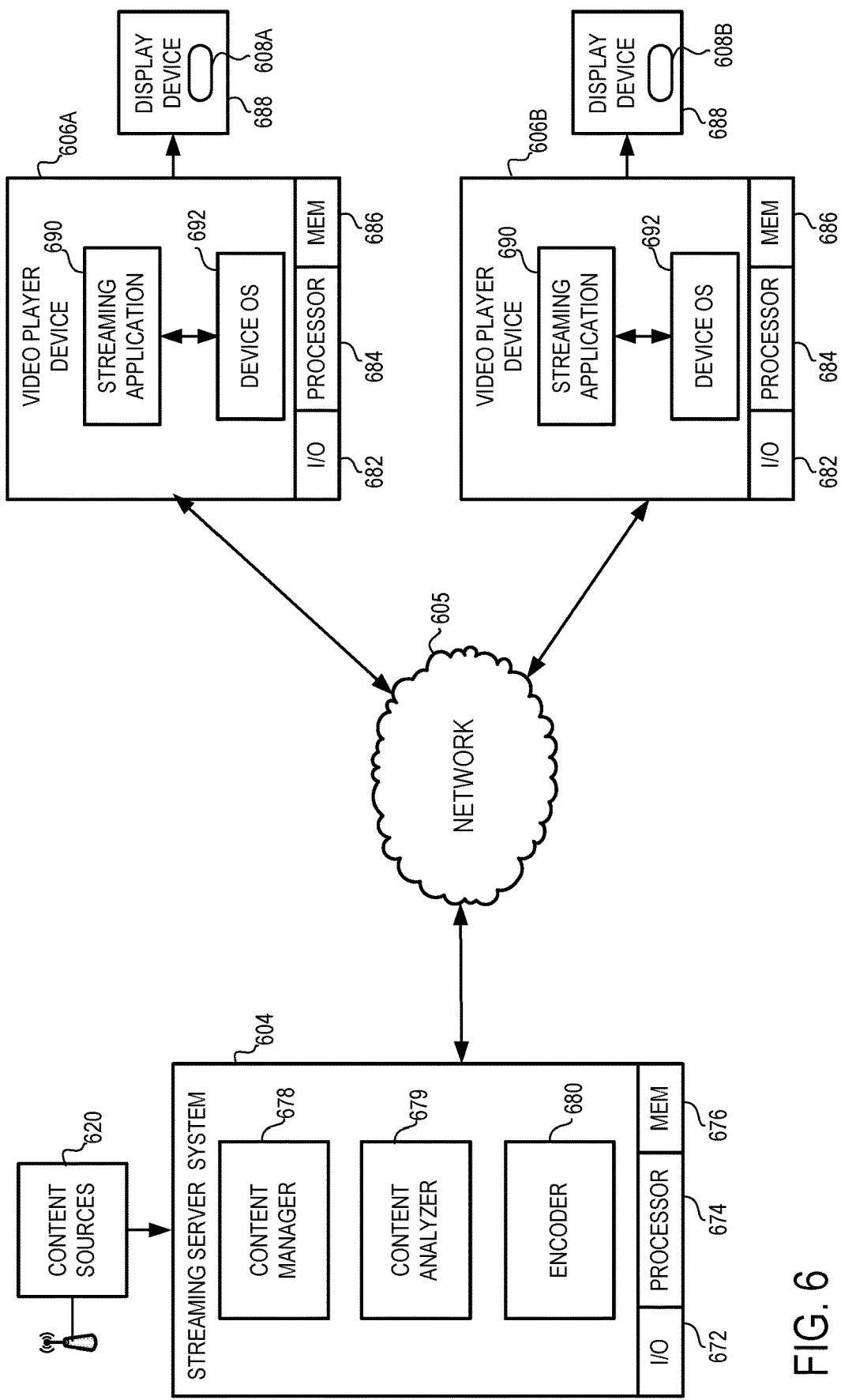

FIGS. 4A, 4B, and 4C are schematic views of a user interface in accordance with another embodiment;

FIG. 5 is a flowchart showing various processes executable by various devices in a streaming media system; and FIG. 6 is a detailed diagram of one example implementation of a streaming media system.

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

The various embodiments descried herein provide systems, devices and/or processes to improve the delivery of commercial content in a video streaming system. Specifically, the various embodiments provide an improved user interface for a video streaming system. In general, this user interface displays programming information to the user for a plurality of program channels and facilitates user selection of program channels for streaming.

The user interface described herein presents this programming information to the user in an intuitive and useful manner. Specifically, in one embodiment the user interface displays indications of program content of past time slots along with current and future time slots in a way that give the user an intuitive understanding of the percentage of remaining time in the current program. Thus, a user can immediately ascertain the percentage of the current program that has already been streamed relative to the percentage of the current program remaining. This information allows a user to more quickly decide if they would like to start viewing a program that has already been streaming for some period of time. Thus, the improved user interface increases information provided to the user and improves the user experience of the video streaming system.

In one embodiment the user interface includes a plurality of rows, where each of the plurality of rows corresponds to a program channel. Each of plurality of rows includes an indication of program content for at least one past time slot, an indication of program content for a current time slot, and an indication of program content for at least one future time slot. Thus, each row displays past, current and future program content for one of the program channels. Taken together, these indications of past, current and future program content provide the user an intuitive visual representation of the percentage of remaining content versus past content for programs that are currently available for streaming. Stated another way, each row in the user interface provides a representation of program content that allows the user to easily ascertain the percentage of the current program that has already been streamed relative to the percentage of the current program remaining. Again, this allows users to more quickly decide if they would like to begin viewing such a program.

The general concepts described herein may be implemented in any video streaming context, but are especially relevant to the streaming of television programming that commonly includes live or pre-recorded programming. Of course, equivalent embodiments could be implemented within other contexts, settings or applications as desired.

Figure 1:
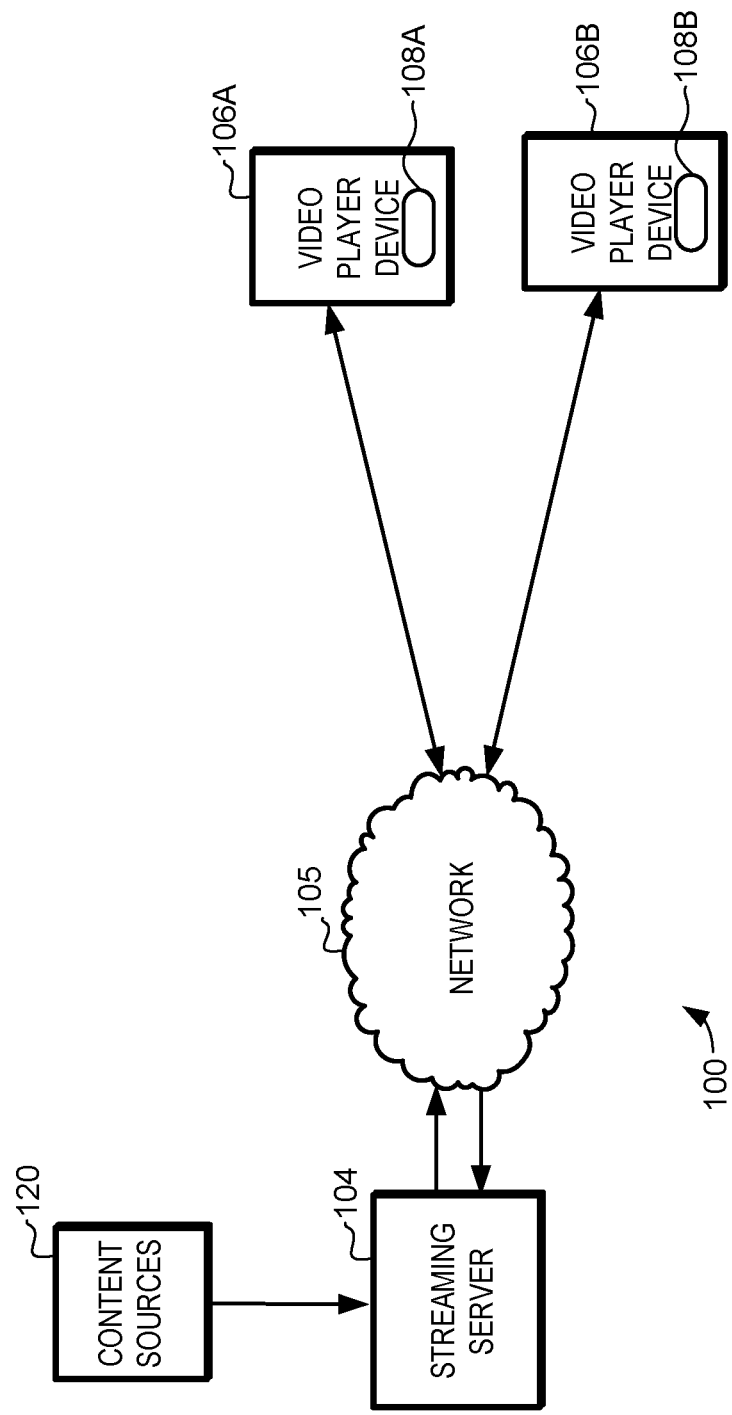
FIG. 1 is a diagram of an example video streaming system that includes a plurality of video player devices.

Turning now to the drawings and with initial reference to FIG. 1, a video streaming system 100 suitably includes a streaming server 104 and a plurality of video player devices 106A-b. In general, the streaming server 104 receives video content from one or more content sources 120, and transmits that video content through the network 105 to the video player devices 106A-b in the form of a video stream that can be received, processed, and displayed at the video player devices 106A-b.

The content sources 120 can be any type of video content source, including media providers, content aggregators or distributors such as a cable television system operator, a direct broadcast satellite (DBS) system operator, or simply a network service provider or the like. These content sources 120 can provide the video content to the streaming server 104 in any suitable form and by any suitable technique. For example, the video content can be provided via satellite, fiber optic or any other conventional wireless or physical media for transmitting signals. The transmitted signals can be received, demodulated and decoded as needed by any appropriate receiver(s) to extract program signals. The extracted programming signals can then be analyzed as appropriate to identify the program contents. A distributor/aggregator, for example, may encode the extracted signals for distribution on a digital network, for aggregation and redistribution of signals over a DBS or cable distribution system, for generating content stored on a remote storage digital video recorder (RSDVR) or video on demand (VOD) service, or for any other purpose.

This content can then be passed to the streaming server 104. Having received this content, the streaming server 104 can encode the received content into a suitable format streaming to the video player devices 106A-B. For example, the streaming server 104 can transmit an encoded video stream via a content delivery network (CDN) for distribution on network 105 (e.g., the Internet) as part of an RSDVR, VOD or other video streaming service. The video streams are thus transmitted to the video player devices 106A-b.

In general, each of the video player devices 106A-B includes a combination of hardware and/or software needed to receive, process, and play the video streams received from the streaming server 104. As examples, each of the video player devices 106A-B can be implemented to include a streaming application stored in memory and being executed by a suitable processor. As some specific examples, each of the video player devices 106A-B can be implemented with any suitable computing device, including laptops, tablets, virtual reality (VR) devices, and mobile communication devices (e.g., smart phones). Such devices may include an integrated display screen, or may be coupled to a separate display screen.

In one example embodiment, the video streaming system 100 is implemented to perform one or more automated processes during the streaming of video content from the streaming server 104 to the plurality of video player devices 106A-B. An example of such an automated process is described below with reference to FIG. 5.

In accordance with the embodiments described herein the streaming system 100 generates user interfaces 108A-B that are displayed on a display device associated with the video player device 106A-B. In general, the user interface 108 is generated with program code and data transmitted from the streaming server 104 to the video player device 106. The code and data is then processed at the video player device 106 to create the user interface for display on the display device.

For example, the streaming server 104 can generate the user interface 108 using a combination of a scripting programming code (e.g., JavaScript), markup language (e.g., Hypertext Markup Language (HTML) and style sheets (e.g., Cascading Style Sheets (CSS)) that are transmitted to the video player device. The video player device 106 interprets code and data to generate the user interface 108 on the display.

In accordance with the embodiments described herein, the user interface 108 generated at the video player device 106 displays indications of program content of past time slots along with current and future time slots in a way that give the user an intuitive understanding of the percentage of remaining time in the current program. In one embodiment the user interface 108 includes a plurality of rows, where each of the plurality of rows corresponds to a program channel. Each of plurality of rows includes an indication of program content for at least one past time slot, an indication of program content for a current time slot, and an indication of program content for at least one future time slot. Thus, each row displays past, current and future program content for one of the program channels. Taken together, these indications of past, current and future program content provide the user an intuitive visual representation of the percentage of remaining content versus past content for programs that are currently available for streaming. Stated another way, each row in the user interface provides a representation of program content that allows the user to easily ascertain the percentage of the current program that has already been streamed relative to the percentage of the current program remaining. This information allows a user to more quickly decide if they would like to start viewing a program that has already been streaming for some period of time in the past. Thus, the improved user interface increases information provided to the user and improves the user experience of the video streaming system.

In one specific embodiment, an automated process is executable by the streaming server 104 in communication with the video player device 106. In such an embodiment the automated process comprises: generating data for a user interface 108 for display at the video player device, where the user interface includes a plurality of rows, with each of the plurality of rows corresponding to a program channel of a plurality of program channels. In this embodiment each of the plurality of rows includes an indication of program content for at least one past time slot, an indication of program content for a current time slot, and an indication of program content for at least one future time slot. So configured, the user interface 108 facilitates the receiving of user inputs to select a program channel for streaming from the plurality of program channels.

In one embodiment, the user interface 108 is further implemented to include a highlighted indication of current program content in each of the plurality of rows. In such an embodiment, the highlighted indication can comprise a display of a different color relative to other portions of the row.

In another embodiment, the user interface 108 additionally includes a current indicator proximate the plurality of rows. In such and embodiment the current time indicator can comprise a line extending over the plurality of rows.

In one embodiment, the user interface 108 facilitates user input to selectively increase or decrease a number of rows displayed in the plurality of rows. In another embodiment, the user interface 108 facilitates user input to selectively increase or decrease a number of past time slots displayed in each of the plurality of rows responsive to a user input. In another embodiment, the user interface 108 facilitates user input to selectively increase or decrease a number of future time slots displayed in each of the plurality of rows responsive to a user input.

It should be noted the term "row" as used in this specification does not require any specific orientation with respect to an edge or side of the display. Thus, it would not be required that the plurality of rows be arranged with a major axis of the rows parallel to the bottom or top of the display. Instead, the rows could be implemented with the major axis at other angles relative to the display, including vertically.

Turning now to FIG. 2, an example embodiment of user interface 208 is illustrated schematically. The user interface 208 is an example of a user interface that can be generated by a streaming server (e.g., streaming server 104) and one or more video player devices (e.g., video player devices 106A-B).

In accordance with the embodiments described herein the user interface 208 includes a plurality of rows 210. Each of the plurality of rows 210 corresponds to one of a plurality of program channels (i.e., CN 1, CN 2, CN 3, CN 4, and CN 5). Each of the plurality of rows 210 includes indications of program content for at least one past time slot, an indication of program content for a current time slot, and an indication of program content for at least one future time slot. In this specific example the at least one past time slot includes two past time slots and the at least one future time slot includes four future time slots, but this is just one example implementation. Furthermore, in some embodiments the number past time slots and future time slots can be made user configurable.

It should be noted that in this example the current time is between 2:30 PM and 3:00, as indicated by the position of the "CURRENT TIME SLOT", and the user interface 208 includes time slots from 1:30 PM to 4:30 PM. In a typical embodiment the rows 210 would shift across the user interface 208 as time progresses. As one example, when the current time passes 3:00 the rows 210 would shift left across the display screen such that the user interface 208 would then include time slots from 2:00 PM to 5:00 PM.

Next it should be noted that while FIG. 2 shows time slots of ½ hour, that this is just one possible implementation. For example, other implementations could use time slots of ¼ hour or 1 hour, to give two non-limiting examples.

Figure 3B:
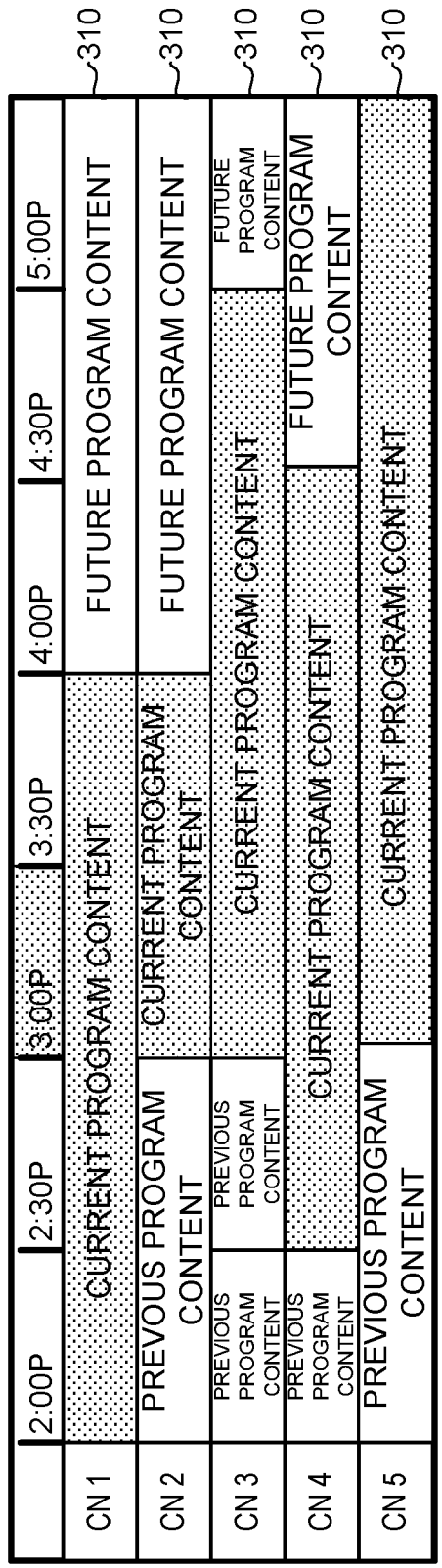

Turning now to FIGS. 3A and 3B, a second example embodiment of user interface 308 is illustrated schematically. Again, the user interface 308 is an example of the type of user interface that can be generated by a streaming server (e.g., streaming server 104) and one or more video player devices (e.g., video player devices 106A-B). Again, the user interface 308 includes a plurality of rows 310, with each of the plurality of rows 310 corresponding to one of a plurality of program channels (i.e., CN 1, CN 2, CN 3, CN 4, CN 5 in FIGS. 3A and 3B). And again, each of the plurality of rows 310 includes indications of program content for at least one past time slot, an indication of program content for a current time slot, and an indication of program content for at least one future time slot. Specifically, in this example each row 310 includes an indication of program content for two previous timeslots, one current timeslot, and four future timeslots.

Also, in this example, the "CURRENT PROGRAM CONTENT" of each channel is highlighted in the user interface 308. Specifically, the timeslots in each row corresponding to the current program content are highlighted, as illustrated by shading in FIGS. 3A and 3B. This highlighting of the timeslots can be implemented by a change in color, contrast, luminosity and/or brightness to give several non-limiting examples. Conversely, the timeslots corresponding to the "PREVIOUS PROGRAM CONTENT" and "FUTURE PROGRAM CONTENT" are not similarly highlighted. In other embodiments the current program content can be highlighted by changing the size, font, color, contrast, luminosity and/or brightness of the text corresponding to the current program content. In any of these embodiments the highlighting serves to make it easier for a user to quickly identify the timeslots that correspond to the current program content, including past and future timeslots.

In the illustrated example of FIG. 3A, the current time is between 2:30 PM and 3:00 PM. Also, in this example the current program content for CN 1 began at 2:00 PM and continues to 4:00 PM. Thus, the timeslots for 2:00 PM, 2:30 PM, 3:00 PM and 3:30 PM are highlighted in the row 310 for CN 1. For CN 1 the row 310 shows previous program content from 1:30 PM to 2:00 PM and future program content from 4:00 PM to 5:00 PM, and those timeslots are not similarly highlighted.

Likewise, for CN 2 the current program content began at 2:00 PM and continues to 3:00 PM. Thus, the timeslots for 2:00 PM and 2:30 PM are highlighted in the row 310 for CN 2. For CN 2 the row 310 shows previous program content from 1:30 PM to 2:00 PM and future program content from 3:00 PM to 5:00 PM, and again those timeslots are not similarly highlighted.

The other rows 310 in the user interface 308 similarly include past timeslots, the current timeslot, and future timeslots for CN 3, CN 4 and CN 5. Thus, the previous, current, and future content for CN 3, CN 4, and CN 5 are displayed in corresponding rows 310.

In one embodiment the user interface 308 would "shift" the content displayed in the rows 310 as time passes to update the program content being indicated. For example, the timeslots displayed in each of the rows 310 could shift in response to the current time nearing or entering a new timeslot. In the illustrated example of FIG. 3B, the current time is now between 3:00 PM and 3:30 PM, and the content being displayed in the rows 310 have been shifted accordingly. Thus, in this example the content for the previous timeslot for 1:30 PM to 2:00 PM is no longer displayed, and the content for the future timeslot for 5:00 PM to 5:30 PM is now displayed.

The current program content for CN 1 again extends from 2:00 PM to 4:00 PM and is again highlighted. For CN 1 row 310 also shows future program content from 4:00 to 5:30. Likewise, for CN 2 the current program content now begins at 3:00 PM and continues to 4:00 PM and is similarly highlighted. For CN 2 the row 310 shows previous program content from 2:00 PM to 3:00 PM and future program content from 4:00 to 5:30. The shifted previous, current, and future content for CN 3, CN 4, and CN 5 are similarly displayed in corresponding rows 310.

Turning now to FIGS. 4A, 4B and 4C, a third example embodiment of user interface 408 is illustrated schematically. Again, the user interface 408 is an example of the type of user interface that can be generated by a streaming server (e.g., streaming server 104) and one or more video player devices (e.g., video player devices 106A-B). And again, the user interface 308 includes a plurality of rows 410, with each of the plurality of rows 410 corresponding to one of a plurality of program channels (i.e., HDO, FS, CMAN, MARZ and HOST in FIGS. 4A and 4B). And again, each of the plurality of rows 410 includes indications of program content for at least one past time slot, an indication of program content for a current time slot, and an indication of program content for at least one future time slot. Specifically, in this example each row 410 includes an indication of program content for two previous timeslots, one current timeslot, and four future timeslots.

Also, in this example, the current program content of each channel is highlighted in the user interface 408, as illustrated with shading in the timeslots that correspond to the current program content.

Also, in this example, the user interface 408 includes a current time indicator 412 proximate to the plurality of rows 410. Specifically, in this embodiment the current time indicator 412 comprises a line that extends over the plurality of rows. In this example, the current time indicator 412 is implemented to moves across the current timeslot as time progresses. In FIG. 4A the current time indicator 412 indicates a current time of approximately 2:46 PM. In FIG.

4B time has progressed and the current time indicator 412 indicates a current time of approximately 2:54 PM.

In FIG. 4C time has progressed further such that the user interface 408 has shifted to the next timeslot. Thus, in this example of FIG. 4C the content for the previous timeslot for 1:30 PM to 2:00 PM is no longer displayed in the user interface 408, the content for the future timeslot for 5:00 PM to 5:30 PM is now displayed. Likewise, the current time indicator indicates a current time of approximately 3:07 PM.

As can be seen in FIGS. 4A, 4B, and 4C the user interface 408 provides users with an intuitive visual representation of the percentage of remaining content versus past content for programs that are currently available for streaming. Thus, user interface 408 allows a user to easily ascertain the percentage of the current program that has already been streamed relative to the percentage of the current program remaining. This allows a user to more quickly determine if they would like to start viewing a particular streaming program.

As described above, in some embodiments the user interface (e.g., user interface 108, 208, 308, and 408) facilitates user input to selectively increase or decrease a number of rows displayed in the user interface. For example, the user interface can include a drop down menu or other interface element to allow the user to select the number of rows that are displayed. In other embodiments these settings could be modified according to stored user preferences.

Also, in some embodiments the user interface facilitates user input to selectively increase or decrease a number of time slots displayed in each of the plurality of rows responsive to a user input. Again, the user interface can include a drop down menu or other interface element to allow the user to select the number of timeslots that are displayed. This can include selecting both the number of past time slots displayed and the number of future time slots displayed.

Turning now to FIG. 5, a process flow diagram 500 illustrates various example processes and data flows that can be automatically executed by a streaming server (e.g., streaming server 104) in a video streaming system (e.g., video streaming system 100) that includes one or more video player devices (e.g., video player devices 106A-B). Specifically, the process flow diagram 500 illustrates a process flow between an exemplary streaming server and an exemplary video player device that provides a user interface generated at the video player device displays indications of program content of past time slots along with current and future time slots in a way that give the user an intuitive understanding of the percentage of remaining time in the current program. The process flow generates a user interface (e.g., user interface 108, 208, 308, 408) includes a plurality of rows, where each of the plurality of rows corresponds to a program channel. Each of plurality of rows includes an indication of program content for at least one past time slot, an indication of program content for a current time slot, and an indication of program content for at least one future time slot. Thus, each row displays past, current and future program content for one of the program channels.

To facilitate the process flow, communications between the various devices can be initiated and established in any suitable manner. For example, communication between the various devices and networks may be established using Internet or other protocols that can include both wireless networking systems (e.g., Wi-Fi) or wired networking systems (e.g., Ethernet or HDMI).

At process step 502 the streaming server generates data for a user interface for display on the video player device. The user interface is generated to include a plurality of rows, where each of the plurality of rows corresponds to a program channel. Each of plurality of rows again includes an indication of program content for at least one past time slot, an indication of program content for a current time slot, and an indication of program content for at least one future time slot. Thus, each row displays past, current and future program content for one of the program channels. In process step 502 the data generated can include program code that is transmitted to the video player device. For example, the streaming server can generate the user interface using a combination of a scripting programming code (e.g., JavaScript), markup language (e.g., Hypertext Markup Language (HTML) and style sheets (e.g., Cascading Style Sheets (CSS)) that are transmitted to the video player device.

At interface transmit step 504 the streaming server transmits the program code and associated data defining the user interface to the video player device. At process step 506 the video player device displays the user interface. This typically is performed by the user interface receiving and executing the received program code and associated data. The resulting graphical representation of the user interface is then transmitted to the display to generate the user interface on the display.

At process step 508 a user input selecting a program channel is received via the user interface. In this step the user interface allows a user to select one of the displayed program channels for streaming. This selection by the user can be implemented using any suitable technique. For example, the user interface can be implemented to allow a user to scroll through the program channels to a desired program channel and then press enter to select the desired program channel. Alternatively, the user interface can facilitate program channel selection with a mouse, touchpad, or other pointing device. Again, these are just some of the examples of how the user interface can be implemented to receive such a user input.

At user input transmit step 510 the user input selection is transmitted from the video player device to the streaming server. Again, this step can be performed using any suitable technique.

At process step 512 the streaming server initiates a streaming video session and begins transmitting a video stream of a program channel selected by the user to the video player device using video transmit function 514. Process step 512 and video transmit function 514 can include the encoding and transmitting of the selected program channel from any suitable content source. Additionally, such processing and transmitting can include transmitting using any suitable technique or protocol. As one detailed example, the streaming server can transmit an encoded video stream via a content delivery network for distribution the Internet as part of an RSDVR, VOD or other video streaming service. In these and other such embodiments these videos streams are thus received at the video player devices as input video streams.

At process step 516, the video player device processes the received input video streams of the program channel for display on the video player device. In this process step a streaming application and/or operating system and/or specialized hardware on the video player device performs typical video processing tasks associated with the receiving and displaying of video. For example, these elements can perform various decoding and rendering functions as needed to display the program channel on a video display device.

Thus, the process flow illustrated in FIG. 5 can facilitate the display of past, current and future program content that provides the user an intuitive visual representation of the percentage of remaining content versus past content for programs that are currently available for streaming. Stated another way, each row in the user interface provides a representation of program content that allows the user to easily ascertain the percentage of the current program that has already been streamed relative to the percentage of the current program remaining. This information allows a user to more quickly decide if they would like to start viewing a program that has already been streaming for some period of time.

Turning now to FIG. 6 a video streaming system 600 suitably includes a streaming server system 604 and a plurality of video player devices 606A-B. In general, the streaming server system 604 receives video content from one or more content sources 620, and transmits that video content through the network 605 to the video player devices 606A-B in the form of a video stream that can be received, processed, and displayed at the video player devices 606A-B. The video streaming system 600 is an example of the type of system that can be used to facilitate the use of a user interface that displays indications of program content of past time slots along with current and future time slots in a way that give the user an intuitive understanding of the percentage of remaining time in the current program. For example, the video streaming system 600 can be used to implement the process flow illustrated in the process flow diagram 500 of FIG. 5.

In general, the content sources 620 can be any type of video content source, including media providers, content aggregators or distributors such as a cable television system operator, a direct broadcast satellite (DBS) system operator, or simply a network service provider or the like. The streaming server system 604 processes the received content into a suitable format streaming to the video player devices 606A-B. To facilitate this, the streaming server system 604 includes at least an I/O 672, a processor 674, and a memory 676. Additionally, the streaming server system 604 includes a content manager 678, a content analyzer 679, and an encoder 680.

In general, each of the video player devices 606A-B includes a combination of hardware and/or software needed to receive, process, and play the video streams received from the streaming server system 604. For example, each of the video player devices includes an I/O 682, a processor 684, a memory 686, and a display device 688. Furthermore, each of the video player devices 606A-B includes a streaming application 690 and a device OS 692 residing in memory 686 and being executed by the processor 684. As some specific examples, each of the video player devices 606A-B can be implemented with any suitable computing device, including laptops, tablets and mobile communication devices (e.g., smart phones). Such devices may include an integrated display device 688, or may be coupled to a separate display device 688.

In accordance with the embodiments described herein the video player devices 606A-B are configured to generate and display user interfaces 608A-B on the display device 688. Specifically, the video streaming system 600 is configured to generate user interfaces 608A-B on the display devices 688. Each of these user interfaces 608A-B includes a plurality of rows (e.g., rows 210, rows 310, rows 410) where each of the plurality of rows corresponds to a program channel. Again, each of plurality of rows includes an indication of program content for at least one past time slot, an indication of program content for a current time slot, and an indication of program content for at least one future time slot.

The content sources 620 can include content from a content aggregator or distributor such as a cable television system operator, a direct broadcast satellite (DBS) system operator, a streaming media provider, or simply a network service provider or the like. Other embodiments could provide the features described herein using conventional computing machinery (e.g., physical or cloud based servers) by parties that may or may not be interested in re-distributing the received content, as desired.

In various embodiments, television signals for one or more networks, channels or the like are received in any format by the system operator via satellite, fiber optic or any other conventional wireless or physical media for transmitting television signals. The signals are received, demodulated and decoded as needed by any appropriate receiver(s) to extract program signals that represent the decoded television program stream. Alternately or additionally, content sources 620 may receive content directly from a broadcaster, distributor or other source, as desired.

In a typical embodiment the received programming signals are analyzed as appropriate to identify the program contents. For example, the content analyzer 679 can be implemented to analyze audio and/or video content in the programming signals. Such a system can be used to recognize advertisements (e.g., commercials) or other portions of the underlying content. In a typical embodiment, the content analyzer 679 executes a software application that performs the analysis based upon the audio and/or video content received. In various embodiments, content analyzer 679 may consider average zero crossing rate, average spectrum, spectral flatness, prominent tones across a set of frequency bands, bandwidth and/or any other characteristics of the audio or video signal. Other embodiments could equivalently perform a temporal analysis in addition to or in place of frequency analysis. Such a temporal analysis could, for example, identify peak (or peak RMS) values in the time domain signal to find beats (e.g., in music) or other times between peak values that can uniquely identify the content. This temporal analysis could be combined into a fingerprint or signature in any way, or could be considered separately from other factors. Many different audio and video fingerprinting or other automated analysis programs could be used in any number of other embodiments.

The extracted content data may be compared to data previously stored in a database, as appropriate, to identify portions of content in the program stream. Commercials, for example, can be recognized when the audio portions of the program stream contain similar data to known audio data stored in a database. Such a database may make use of conventional database software, or the database may be a custom database developed to store content recognition data, as desired. Such a database may reside on the same computing hardware as the streaming server system 604, or separate computing resources could be provided, including any sort of cloud-based computing resources.

In one specific embodiment, the content analyzer 679 is configured to recognize scene changes in the underlying content. When a different scene is identified in the content analyzer 679 attempts to recognize the scene based upon digital analysis of the audio and/or video. If the scene already exists in the database, then a new occurrence of the recognized scene can be recorded in the database or elsewhere. If the scene is not recognized, then a new entry in the database may be created to identify subsequent occurrences of the same scene. To that end, a digital "signature" or "fingerprint" of the scene is stored for subsequent analysis. Content may be initially recognized based upon information supplied by human data entry (e.g., crowdsourced data, or data entered by a technician), or by data supplied by a content source (e.g., an advertiser, broadcaster or network), and/or from any other source as desired. Content analyzer 679 is therefore able to identify advertisements or other contents of the received television broadcasts and other video though analysis of the underlying audio or video content.

In many implementations, content identification is performed by the content analyzer 679 in parallel for multiple channels that may be simultaneously received for content aggregation, for collection of advertising data, or for any other purpose. A distributor/aggregator, for example, may encode the extracted signals for distribution on a digital network, for aggregation and redistribution of signals over a DBS or cable distribution system, for generating content stored on a RSDVR or VOD service, or for any other purpose. Content identification could be performed while the content is being processed for redistribution. Alternately, content could be stored for subsequent analysis, as desired.

In some embodiments the content analyzer 679 can perform content analysis in parallel with the encoding provided by the encoder 680. The encoder 680 can encode live broadcast signals and other such video content for adaptive streaming on the network 605 and/or for broadcast via cable, direct broadcast satellite, terrestrial broadcast, and/or the like. Encoder 680, for example, can be used to encode signals into a suitable format for broadcast via cable, DBS, or the like. Such broadcasts may be ultimately received by video player devices 606A-B via the network 605 or the like. In one specific example, the encoder 680 suitably encodes programs contained within signals from the content sources 620 into one or more adaptive streams that each representing a media program in its entirety, but with different bit rates, frame rates, resolution and/or other levels of quality. Typically, each stream is made up of smaller segments that each represent a small portion of the program content with a single data file. Each stream is typically encoded so that segments of the different streams are interchangeable with each other, often using a common timing index. This allows a client video player devices 606A-B to mix and match segments from different streams to create a media stream that effectively adapts as network conditions or other conditions change. Since the segments are typically stored as separate files, segment requests may take the form of conventional hypertext transport protocol (HTTP) constructs (e.g., HTTP "get" instructions) or the like. Such constructs are readily routable on network 605 and can be served by conventional CDN or other web-type servers, thereby providing a convenient mechanism for distributing adaptive media streams to a variety of different client devices on network 605.

Again, other embodiments may use different encoders for the encoder 680. Still other embodiments may omit the encoding function entirely and perform audio analysis or other content recognition separately from the distribution function. Since many distributors already receive program signals for encoding, there may be an economy of scale in performing the content recognition function at the same time. Other embodiments could nevertheless use different encoding or streaming structures or techniques, as desired, or content could be equivalently aggregated and/or broadcast via satellite, cable, terrestrial broadcast, non-adaptive media stream and/or the like. As noted above, it is not necessary that the analyzed content be re-broadcast or re-distributed by the analyzing party in all embodiments. It may be sufficient for many purposes to simply gather data for recognizing advertisements or other portions of the content, for analyzing or further processing information about the recognized advertisements and/or for taking other actions as desired without necessarily re-broadcasting or redistributing the content itself.

Content manager 678 is provided to manage and distribute electronic program guide (EPG) data and other information about the programs that are distributed within streaming server system 604. The content manager 678 may also be implemented to process information relating to advertisements or other portions of the content stream, to associate actions to be performed by the viewer and/or the playback device based upon the content of the stream, and/or for any other purpose.

The data maintained by the content manager 678 could include channel information and timing information about each entry so that the particular content can be readily identified. Other embodiments may use different identification data, such as distributor or network information, or any other information as desired. Some implementations may incorporate conventional EPG data (e.g., data obtained from a vendor or other source), while other implementations may use channel information and time so that even portions of a program can be individually identified. Commercials and other advertisements, for example, could be referenced by their channel and broadcast time so that additional actions unique to those advertisements could be enabled. Other embodiments could use different timing references (e.g., references to MPEG presentation time stamps (PTS) in the underlying content, references to event anchors in the content itself, and/or any other timing references) as desired.

In various embodiments, data including information obtained from the content analysis is provided to the video player devices 606A-B. This data could be formatted in any manner. In various embodiments, data could include action data and/or identification data as tags or the like in an XML-type format. Again, many other embodiments could incorporate any number of additional or alternate features to take advantage of the real-time identification feature provided by the broadcaster.

The various concepts and examples described herein may be modified in any number of different ways to implement equivalent functions and structures in different settings. The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process executable by a streaming server in communication with a video player device over a network, the automated process comprising:
 generating data for a user interface for display at the video player device, where the user interface includes:
 a plurality of rows oriented horizontally and shifting across the user interface in response to time passing, each of the plurality of rows corresponding to a program channel of a plurality of program channels, wherein each row of the plurality of rows includes:
    an indication of program content for a past time slot, the past time slot corresponding to a period that has ended, the indication of program content for the past time slot disposed in the row;
    a shaded indication of program content for a current time slot disposed in the row and adjacent the indication of program content for the past time slot;
    an indication of program content for a future time slot, the future time slot corresponding to a period that has not started, the indication of program content for the future time slot disposed in the row and adjacent the shaded indication of program content for the current time slot,
    wherein the shaded indication of program content for the current time slot is shaded different than the indication of program content for the past time slot and the indication of program content for the future time slot,
wherein a first row from the plurality of rows includes a first shaded indication of program content,
wherein a second row from the plurality of rows includes a second shaded indication of program content, and
wherein a first beginning and a first end of the first shaded indication is staggered from a second beginning and a second end of the second shaded indication;
a current time indicator that extends over the shaded indication of program content for the current time slot in each row, wherein the current time indicator moves horizontally across the rows in response to time passing; and
receiving a user input via the user interface to select a program channel in the plurality of program channels.

2. The automated process of claim 1 wherein the user interface further includes a highlighted indication of current program content in each of the plurality of rows.

3. The automated process of claim 2 wherein the highlighted indication of current program content comprises a display of different color relative to other portions of the row.

4. The automated process of claim 2 wherein the highlighted indication of current program content comprises a display of different intensity relative to other portions of the row.

5. The automated process of claim 1 wherein the current time indicator is proximate the plurality of rows.

6. The automated process of claim 5 wherein the current time indicator comprises a line extending over the plurality of rows.

7. The automated process of claim 1 wherein the user interface facilitates a user input to increase or decrease a number of rows in the plurality of rows.

8. The automated process of claim 1 wherein the user interface is configured to increase or decrease a number of past time slots indicated in each of the plurality of rows responsive to a user input.

9. The automated process of claim 1 wherein the user interface is configured to increase or decrease a number of future time slots indicated in each of the plurality of rows responsive to a user input.

10. The automated process of claim 1 further comprising streaming the selected program channel as a video stream from the streaming server to the video player device.

11. An automated process executable by a streaming server in communication with a video player device over a network, the automated process comprising:
    generating data for a user interface for display at the video player device, where the user interface includes:
        a plurality of rows that shift across the user interface in response to time progressing, each of the plurality of rows corresponding to a program channel of a plurality of program channels, wherein each row of the plurality of rows includes:
            an indication of program content for a plurality of past time slots, each of the plurality of past time slots corresponding to a period that has ended;
            a shaded indication of program content for a current time slot;
            an indication of program content for a plurality of future time slots, each of the plurality of future time slots corresponding to a period that has not started;
            wherein the shaded indication of current program content is highlighted in the row with shading different from the indication of program content for the past time slot and the indication of program content for the future time slot;
            wherein a length of the shaded indication of each row is based on a start time and an end time of the current time slot; and
        a current time indicator proximate the plurality of rows, the current time indicator comprising a line that extends vertically over the plurality of rows, wherein the current time indicator moves horizontally across the shaded indication of the current time slot in response to time progressing;
    receiving a user input via the user interface to select a program channel in the plurality of program channels; and
    streaming the selected program channel as a video stream from the streaming server to the video player device.

12. A streaming server in communication with a video player device over a network, the streaming server comprising a processor and a memory, wherein the processor is configured to perform an automated process by executing digital instructions stored in the memory, wherein the automated process comprises:
    generating data for a user interface for display at the video player device, where the user interface includes:
        a plurality of rows oriented horizontally and shifting across the user interface, each of the plurality of rows corresponding to a program channel of a plurality of program channels, wherein each row of the plurality of rows includes:
            an indication of program content for a past time slot, the past time slot corresponding to a period that has ended, the indication of program content for the past time slot disposed in the row;
            a shaded indication of program content for a current time slot disposed in the row and adjacent the indication of program content for the past time slot;
            an indication of program content for a future time slot, the future time slot corresponding to a period that has not started, the indication of program content for the future time slot disposed in the row and adjacent the shaded indication of program content for the current time slot,
            wherein the shaded indication of current program content comprises a shading different from the indication of program content for the past time slot and the indication of program content for the future time slot, wherein a length of the shaded indication of each row is based on a start time and an end time of the current time slot; and receiving a user input via the user interface to select a program channel in the plurality of program channels.

13. The streaming server of claim 12 wherein the user interface further includes a highlighted indication of current program content in each of the plurality of rows.

14. The streaming server of claim 13 wherein the highlighted indication of current program content comprises a display of different color relative to other portions of the row.

15. The streaming server of claim 13 wherein the highlighted indication of current program content comprises a display of different intensity relative to other portions of the row.

16. The streaming server of claim 12 wherein the user interface further includes a current time indicator proximate the plurality of rows.

17. The streaming server of claim 16 wherein the current time indicator comprises a line extending over the plurality of rows.

18. The streaming server of claim 12 wherein the user interface facilitates a user input to increase or decrease a number of rows in the plurality of rows.

19. The streaming server of claim 12 wherein the user interface is configured to increase or decrease a number of past time slots indicated in each of the plurality of rows responsive to a user input.

20. The streaming server of claim 12 wherein the user interface is configured to increase or decrease a number of future time slots indicated in each of the plurality of rows responsive to a user input.

* * * * *